Nov. 24, 1970
F. T. BAUER ET AL  3,543,119
CONDITION SENSITIVE SPEED CONTROL FOR ELECTRIC MOTORS
UTILIZING A HYSTERESIS CAPACITOR AND A NETWORK
FOR PREVENTING FALSE TRIGGERING
Filed Nov. 17, 1967
2 Sheets-Sheet 1
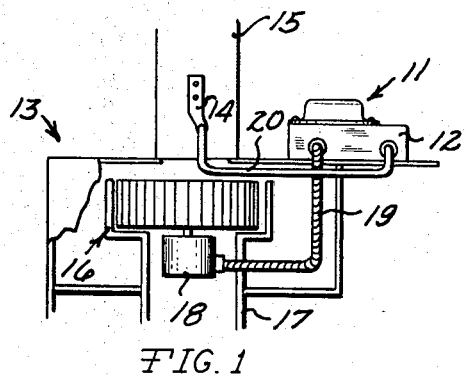
FIG. 1
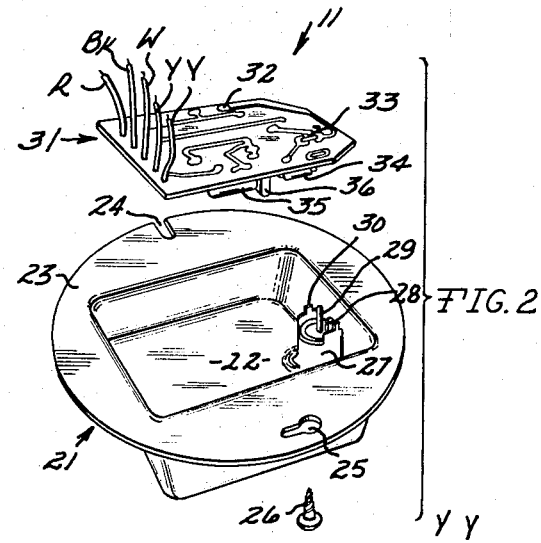
FIG. 2
FIG. 3
FIG. 4
FIG. 6
FIG. 5
INVENTORS
FREDERICK T. BAUER
ALAN F. LIETZKE
BY
ATTORNEYS Nov. 24, 1970     F. T. BAUER ET AL     3,543,119
CONDITION SENSITIVE SPEED CONTROL FOR ELECTRIC MOTORS
UTILIZING A HYSTERESIS CAPACITOR AND A NETWORK
FOR PREVENTING FALSE TRIGGERING
Filed Nov. 17, 1967     2 Sheets-Sheet 2

INVENTORS
FREDERICK T. BAUER
ALAN F. LIETZKE
BY
Miller, Morriss, Pappas, & McLeod
ATTORNEYS

United States Patent Office 3,543,119
Patented Nov. 24, 1970

3,543,119
CONDITION SENSITIVE SPEED CONTROL FOR ELECTRIC MOTORS UTILIZING A HYSTERESIS CAPACITOR AND A NETWORK FOR PREVENTING FALSE TRIGGERING
Frederick T. Bauer and Alan F. Lietzke, Holland, Mich., assignors, by direct and mesne assignments, to Simicon Company, Holland, Mich., a corporation of Michigan
Filed Nov. 17, 1967, Ser. No. 684,019
Int. Cl. H02p 5/12
U.S. Cl. 318—334
1 Claim

ABSTRACT OF THE DISCLOSURE

A solid state control apparatus for electrical motors and the like in which a gated symmetrical switch is activated at its lead gate by the pulsing of a PNP trigger diode. Hence when the pulse is impressed on the gate of the (Triac) gated symmetrical switch then it conducts current to and through an inductance load such as a motor wired in series. Hence the gated symmetrical switch, when pulsed, is rendered conductive to line current and intermediate its on-off function the rate of charge of a capacitor establishes the control speed of the motor through an infinite range monitored by a sensing element, as for example, a thermistor. This structure finds primary use as a blower control, for example, in warm air heating installations where the sensor is thermally responsive.

The present invention is directed to a new and improved phase control structure for the sensing of on-off conditions in an electrical motor and combining speed control over the motor in between the conditions of "on" and "off." More specifically the present invention is a solid state structure admitting of extreme miniaturization and effective directly on line current rather than requiring a pilot control circuit and attendant mechanical relays and the like. This structure was first applied to a 5 ampere shaped pole motor rated at ⅙ horsepower in operation of a blower for warm air in furnaces.

Aside from mere compactness and superior reliability over mechanical electrical control structures the added dimension of speed control within the desired thermal ranges makes the present device particularly adaptable in the heating industry for control of heat delivery fans or blowers.

The solid state character of the control wholly eliminates sparking or arcing and allows the entire circuit module or control to be encapsulated or potted in a suitable receptacle. This renders the device of the present invention tamper proof insofar as the circuit components are considered and additionally provides for simple installation since only the connecting leads extend from the potted receptacle. This potting feature eliminates dust and dirt and secures the semi-conductor or solid state elements against shock and breakage. By providing a control over speed of the motor or movement of current through the motor, the motors so controlled are quiet since the current is automatically adjusted to temperature. Since current can move in two directions the control structure is directly applicable to AC motors.

The closest known device showing or suggesting a solid state motor control system is found in the U.S. Letters Patent to Momberg Re. 25,203 and directed to a motor control system in which a potentiometer excites a diode to open the gate of a rectifier to control speed of a motor in which the field windings and armature are connected in series. This is believed distinguishable from the present invention inasmuch as the gated symmetrical switch of the present invention admits of two way flow of current and no potentiometer is involved to select manually a particular speed. Some similarity is suggested in that the control involves a phase adjustment but in the present invention the sensor is located in the main line and the hysteresis capacitance shifts from series to parallel circuit configuration and a separate capacitance and resistance is inserted to eliminate false triggering. A suppression circuit may be utilized to avoid radio frequency interference.

Accordingly one of the objects of the present invention is to provide a solid state phase control structure for motors which includes adjustment of speed between the off and on condition.

Additionally, an object of the present invention is to provide a solid state phase control in which "false triggering" is avoided.

Another object is to include a solid state phase control which includes a suppressor circuit in avoidance of creating interference with other electronic components.

Another object is to provide a motor control admitting of extreme compactness and encapsulation as by potting to render the control structure rugged and dependable and with no moving parts.

Other objects including the process steps in preparation of the control unit, reduction in cost and simplicity will be apparent to those skilled in the art as the description proceeds.

GENERAL DESCRIPTION

While generally applicable to motor speed control intermediate an on-off condition the present invention is more specifically concerned with direct control over an alternating current inductance load, as a motor, from sensed conditions as for example thermal conditions as obtained in the stack or air plenum of a warm air heater and to control the speed of a blower motor in delivery of air therefrom. Physically, the invention comprises circuit components and solid state switch elements wired to a circuit board and encapsulated or potted in a metal wrapper or housing from which connecting wires in coded colors extend. The wires are then easily connected to a thermal sensor element, to the line (AC) current and to the motor or inductance load requiring control. Hence the control is placed directly in the alternating current main line as is the sensor element and adequate and automatic control of start-stop and speed or voltage is exercised over the inductance load. Within the limits of start and stop an infinite range of control (subject to motor capabilities) is observed and wholly without any moving parts.

At the heart of the circuit is a gated symmetrical switch (solid state) called a "Triac" and available commercially from the General Electric Company. This element is directly connected on both sides in the line and functions as a switch open when the gate is not pulsed and closing when pulsing occurs. The thermistor sensor charges a capacitor until a PNP trigger or avalanche diode achieves its avalanche voltage. The consequent pulse is transmitted to the gate of the gated symmetrical switch and the switch commences conducting current through the inductance load (motor) wired in series. When pulsed, the switch conducts current in either direction. A separate capacitance controlling rate of charge determines the rapidity of the pulsing and hence the speed of the motor.

A characteristic of the present control is a hysteresis or differential feed back in which the hysteresis capacitor is placed in a parallel circuit configuration with the rate of charge capacitance when the gated symmetrical switch is pulsed and discharges the rate of charge capacitor. When the pulsing ceases and line voltage is well past the zero point due to load inductance, the hysteresis capacitor flips back into a series circuit configuration with the rate of charge capacitance. Thus the hysteresis capacitor will rapidly charge the rate of charge capacitor near the avalanche point of the diode and sensor resistance will contribute the small additional charge necessary to move the rate of charge capacitance past the avalanche point of the diode.

Since present three layer PNP diodes are not completely symmetrical, the hysteresis capacitor allows the use of the avalanche diode to provide a device having a definite starting point at lower phase angles while establishing a differential. Hence the use of the hysteresis capacitor provides a low cost method of obtaining differential feed back where desired.

A suppressor circuit is superimposed to eliminate radio frequency interference and to provide a two stage LC filter. As will be seen, false triggering of the gated symmetrical switch is avoided by slowing the increase of applied voltage to an acceptable value.

IN THE DRAWINGS

FIG. 1 is a partial cut away section of a warm air furnace revealing the warm air blower and motor therefor and indicating the sensor connected to the stack and in turn connected to the control of the present invention wired to the motor.

FIG. 2 is an exploded perspective view of the assembly of components into a compact package preliminary to potting or encapsulation.

FIG. 3 is a side view of a circuit board as used in the present invention and indicating the extension therefrom of color coded leads.

FIG. 4 is a full cross section elevation view indicating in phantom line the nesting of electronic components in the case and indicating the resin encapsulating material.

FIG. 5 is a schematic circuit diagram indicating wiring of the control element of the present invention to sensor, line and inductance load or motor.

FIG. 6 is a graph indicating performance of a control in accord with the present invention (solid line trace), as against known prior art mechanical and electrical systems (dashed line trace), and time being graphed against temperatures between about 200 to 700 degrees Fahrenheit thus indicating improved delivery of even temperature air.

SPECIFIC DESCRIPTION

Figure 7:
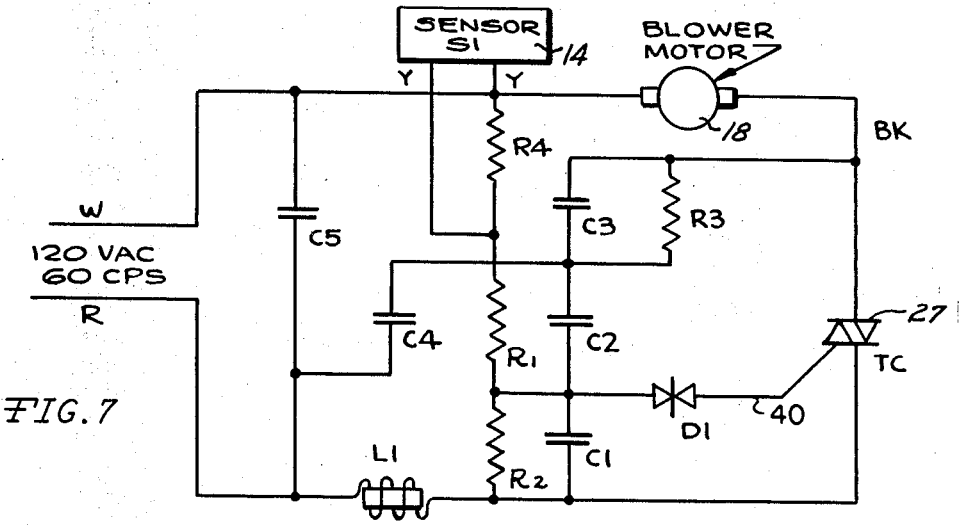
FIG. 7 is a circuit diagram of the solid state blower motor control of the present invention.

Referring to the drawings and with particularity to FIG. 1, thereof, blower motor control element 11 is shown secured to a junction box 12 which is in turn secured conveniently to the upper casing of a warm air furnace 13. A sensor 14 is connected for example to the stack 15 of the furnace 13 and the furnace 13 is partially cut away to indicate the blower or fan 16 positioned in a duct 17 or plenum of the furnace 13 and powered by the motor 18. The leads to the motor 18 are housed in the flexible conduit tube 19. The lead 20 from the sensor element 14 travels to the junction box 12 as does the motor leads in the tube 19. The junction box 12 houses all necessary connections required to place the control unit 11 in operation and may be integrated with separate burner control wiring as will be seen.

In FIG. 2 the control unit 11 is exploded to indicate the metal case 21 with receiving cavity 22 and flanges 23 with mounting slots 24 and 25 allowing fasteners 26 to secure the unit 11 to the junction box 12. A solid state gated symmetrical switch 27 is adhered in place in one corner of the cavity 22 in the case 21. The connecting prongs 28, 29 and 30 extend upwardly vertically, as shown, for integration in the circuit provided in the circuit board 31. The circuit board 31 has imprinted thereon a circuit path of conductive metal 32 and registering openings 33 therethrough, for example, as means to registrably receive the connecting prongs 28, 29 and 30 of the gated symmetrical switch 27. The prongs 28, 29 and 30 are selectively soldered to the circuit paths of metal 32 to provide a secure junction. The colored leads R, BK, W, Y and Y from the control unit 11 enter the circuit board 31. The designation of these leads are by color and they are connected to the circuit, as will be seen, at the circuit board 31.

By reference to FIG. 3 the insertion of the leads R, BK, W, Y and Y is best illustrated as they pass through openings in the top of the board 31, are looped thereunder and their ends extend up through the board, as shown, to connection with the circuit paths 32. Electronic components, as for example diode 34 and capacitor or resistor elements 35 and 36 depend from the board 31, as shown, their leads extending up and into the circuit paths 32 for integration therewith. This entire circuit structure is integrated as by soldering and the whole structure is potted or encapsulated in situ by a non-conducting resin 37 poured into the cavity 22 of the case 21 as shown in FIG. 4, so that only the insulated leads R, BK, W, Y and Y extend therefrom. This renders the circuit dust and tamper proof and relatively shock proof and vibration proof so that the control unit 11 is compact, insulated and convenient to insert in a motor control setting. The potting resins are well known and may vary in composition from rigid thermosets to non-rigid thermoplastics depending upon the quality and character of protection desired.

By reference to FIG. 5 the installation schematics of the control unit 11 are best understood in an actual furnace installation and the colored leads R (red), BK (black), W (white), Y (yellow) and Y (yellow) can be appreciated. Leads 1, 2, and 3 from the burner 37 provide line connections for the circuit as expressed in the control unit 11. This coordinates the blower motor control 11 with the burner controls (not a part of the present invention). In brief the control unit 11 is only capable of operation when power is available for use in the blower and in some installations the commencement of this availability is dependent upon the actuation of the burner. However, the schematic diagram of FIG. 5 clearly shows the field connection of the control 11 to the blower motor 18, to the sensor 14 and to the G (ground) line.

In FIG. 6 the function of the controller 11 of the present invention is indicated as compared against existing blower motor controls. The curve 38 indicates the present control and the curve 39 indicates prior devices in a plot of temperature against time. While prior devices allow the temperature to widely fluctuate because of lack of adequate temperature speed control, the present invention by increasing or decreasing motor speed in direct relation to the desired heat delivery level and to maintain a constancy of heat condition at the sensor. Hence, the delivery of heat from a selected warm air furnace is maintained at a level heat, say at about 500 degrees Fahrenheit over a substantial running period of 9 minutes in which the climb is rapid and the delivery is level. This is all possible by virtue of the solid state control unit 11 exercising a sensed (thermal) control over motor speed and hence blower delivery.

By reference to FIG. 7 the circuit schematic diagram is fully revealed as serving a 120 volt AC source at 60 cycles per second. The thermistor sensor $S_1$ (negative temperature coefficient thermistor) has the capability of shutting off a motor when its resistance exceeds a set value and it is desirable in the present control to provide a fixed hysteresis effect between a low speed start and the low speed shut-off resistance. A sensor can accordingly turn on a motor at a first temperature $T_1$ and speed $S'$ and then turn it off only when the temperature falls below a certain minimum temperature $T_2$ at a lower speed $S''$ and where $T_2$ is less than $T_1$. This is a differential characteristic. Accordingly while phase control is well known in the art, the use of phase control including the differential on-off feature while controlling motor speed is not known.

To accomplish this differential phase control of an inductive load (motor 18) it is necessary to synchronize the gated symmetrical switch 27, hereinafter referred to by its trade designation from the General Electric Corporation as "Triac" (TC) with a line voltage. This is done by connecting the sensor $S_1$ directly to incoming line voltage as shown and not across the Triac (27) itself. A capacitor $C_1$ is provided which is charged by the sensor $S_1$ until the three layer PNP Trigger or avalanche diode $D_1$ has achieved its avalanche voltage. The pulse thus created by the avalanche diode $D_1$ is used in the gate line 40 to activate the gate of the Triac TC. When the pulse is received at the gate of the Triac TC it begins conducting current through the motor 18 wired in series. The Triac TC remains in conducting stage until the current through it goes to zero (line commutation). Then it goes off and will not begin conducting until another pulse is received at the gate of the Triac TC. A characteristic of the solid state Triac TC is to conduct current in either direction when pulsed. Hence the rate of charge capacitance $C_1$ controls the rapidity with which the pulsing occurs and hence controls the speed or voltage of the motor 18.

The starting speed of the motor 18 is governed by several factors:

(1) Motor type and loading
(2) Phase angle of initial trigger pulse
(3) Amount of induced hysteresis Motor type and loading characteristics are relatively fixed by required power cost and operating conditions. Accordingly control of starting speed is best approached by hysteresis adjustment. In the FIG. 7 circuit the phase angle of the very first trigger pulse is governed by the resistance $R_2$ capacitor $C_1$ and the avalanche voltage of the diode $D_1$ for any value of desired turn-on resistance.

Accordingly, if the sensor $S_1$ is a thermistor the control allows the design of the phase angle of the first trigger pulse at a specified temperature. The hysteresis or differential can be achieved by the capacitive coupling of the Triac (TC) to the triggering circuit as shown by the capacitor $C_2$. This is best understood by the circuit diagram of FIG. 8. The amount of the capacitance $C_2$ is directly related to the amount of the differential. Hence for values of capacitance in the capacitor $C_2$ it is possible to give full motor speed or full voltage to the inductive load (motor 18) at the start point and then increase the sensor $S_1$ resistance to the turn off point while lowering motor speeds or RMS voltage to the inductive load (motor 18).

Figure 9:
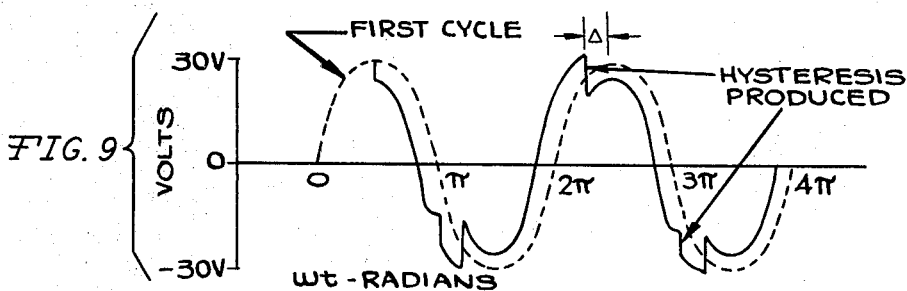
FIG. 9 is a sine wave form traced from an oscilliscope and plotting for voltage against radians and indicating the starting hysteresis produced.

The differential referred to is established by a unique two-step action in each cycle of operation. When the resistance in sensor $S_1$ is high enough that the motor has ceased to operate, then the hysteresis capacitor $C_2$ forms a small bias along with the sensor $S_1$ to charge capacitor $C_1$ to some voltage lower than the avalanche point of the diode $D_1$. Then, as the resistance of the sensor $S_1$ is decreased, the capacitor $C_1$ will rise to the avalanche point of diode $D_1$ and will then fire the Triac TC. Then when the Triac TC is fired the precharged hysteresis capacitor $C_2$ is put in a parallel circuit configuration with $C_1$ contributing to hysteresis. When the Triac TC ceases conducting the line voltage drops past the zero point because of load inductance and the hysteresis capacitor $C_2$ will then flip back to its series circuit configuration with capacitor $C_1$. The capacitor $C_2$ will then charge capacitor $C_1$ very rapidly near the avalanche point of diode $D_1$ and the sensor $S_1$ will thereupon contribute the small amount of charge necesary to push capacitor $C_1$ past the avalanche point of diode $D_1$. Thus $C_2$ has again contributed to the triggering of diode $D_1$ earlier in the next half cycle. In the first few cycles an imbalance occurs because of the fact that the capacitors must charge but within a few cycles the differential will move to an equilibrium point. The wave form of the hysteresis effect is shown in FIG. 9 based on oscilloscope sketches and displaying voltage across the capacitor $C_1$, such wave form being produced as a result of the charging and discharging of the capacitors $C_1$ and $C_2$ and the coaction of the hysteresis capacitor $C_2$ with the capacitor $C_1$. The result of this differential control and "flip over" is not immediately appreciated until it is understood that presently available PNP diodes (avalanche type) are junction devices and are not entirely symmetrical. Without hysteresis, the junction of the trigger diode with the lowest breakover voltage will fire first. Generally the other junction will not find enough voltage present upon which to fire. This is true since the thermistor is continuously variable and goes through an infinite number of resistance changes at a given temperature change. Obviously this result provides DC current through the motor resulting in loud noise and severe overheating until the resistance of the thermistor decreases enough to fire the highest trigger diode junction. With hysteresis the aforementioned strictly undesirable occurrence at starting is avoided. The hysteresis capacitor decreases the phase angle of firing after the first pulse and so completely jumps over the unsymmetrical trigger diode area into a predetermined RMS voltage on the load. The larger the hysteresis capacitor, the further the phase angle is reduced from the initial pulse and hence the larger the RMS voltage delivered to the motor load. The hysteresis produced by the capacitor $C_2$ allows the use of avalanche diodes $D_1$ to produce a structure with a definite starting point at lower phase angles while establishing the differential. The hysteresis capacitor $C_2$ is therefore an extremely simple and low cost way of obtaining differential feed back when such characteristics are desired.

The motors 18 were 5 ampere shaded pole AC motors rated at 1/6 horsepower and porous bronze bearings were utilized to assure lubrication at low revolutions per minute levels.

Figure 8:
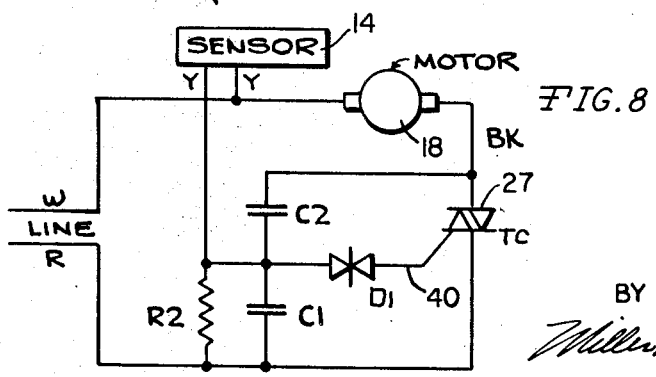
FIG. 8 is a circuit diagram as in FIG. 7 in its simplest form and not including the suppressor circuit.

The control circuit as expressed in FIG. 7 was used which is merely an extension of the circuit of FIG. 8. In the FIG. 7 circuit, the capacitors $C_5$ and $C_3$ with the small inductance coil $L_1$ were included to eliminate radio frequency interference in the AM radio band. This establishes a two stage LC filter for suppression. The inductive load (of coil) $L_1$ establishes a second inductance used in combination with the capacitor $C_5$. The capacitor $C_4$ and resistance $R_3$ are used to prevent $dv/dt$ false triggering or rate effect of the Triac TC. The only triggering that is desired from the Triac is in response to a current pulse from the diode to the gate of the Triac. Any other triggering is unwanted. Junction capacitances distributed throughout the Triac pellet structure can pass enough current when subjected to a fast voltage rise to activate the Triac trigger mechanism. The parallel resistance-capacitance network slows down the rate of rise of the voltage across these distributed junction capacitances and lowers false triggering current levels. Thus the capacitor $C_4$ and resistor $R_3$ slow the increase of applied voltage to an acceptable value and eliminate false triggering of the Triac TC when used with inductive loading.

Figure 10:
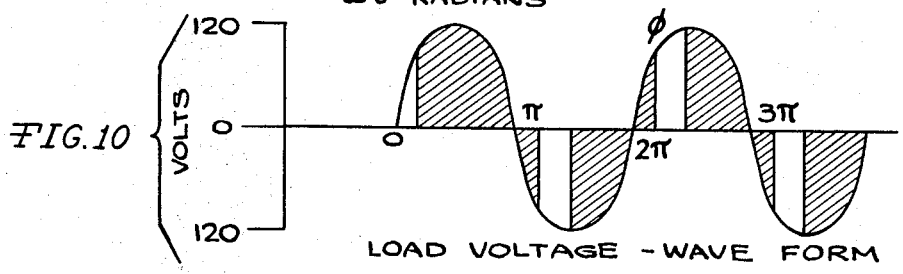
FIG. 10 is a sine wave form as in FIG. 9 and indicating operation at increased voltage.
Figure 11:
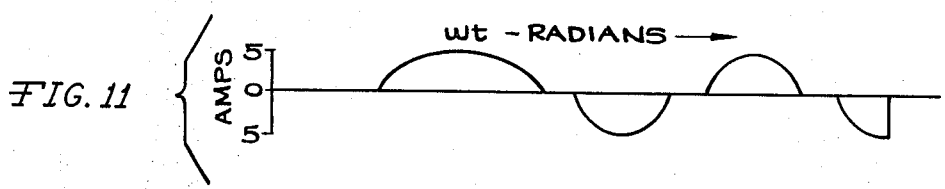
FIG. 11 is a wave form measuring radians versus amperes.

FIGS. 10 and 11 show volts and amps respectively, plotted against radians in an oscilloscope trace of performance of the present control. FIG. 10 illustrates the load voltage wave form as plotted qualitatively against radians in a condition sensitive speed control for electric motors employing the present invention while FIG. 11 illustrates the current wave form as plotted qualitatively against radians.

Having thus described our invention and specific embodiments thereof as applied to control of a blower motor, those skilled in the art will percieve improvements modifications and changes within the skill of the art and such improvements modifications and changes are intended to

We claim:
1. A condition sensitive speed control for electric motors comprising, in combination, a main line source of AC current, a blower motor connected to said main line, a range sensor having one connection to said main line and a second connection, a first capacitance connected to said second connection of said sensor and charged by said sensor, a PNP avalanche diode, a Triac having a pair of terminals and a gate, one of said terminals of said Triac being connected to said motor, one side of said diode being connected to said first capacitance, the other side of said diode being connected to said gate of said Triac, an RFI suppressor network including a pair of capacitors and an inductance coil, a hysteresis capacitor connected between said one terminal of said Triac and said first capacitance, and means including a capacitor and a resistance connected in series circuit across said Triac and said inductance to prevent $dv/dt$ triggering of said Triac.

References Cited
UNITED STATES PATENTS
| | | | |
|---|---|---|---|
| 3,353,078 | 11/1967 | Maynard | 318—334 X |
| 3,367,408 | 2/1968 | Moreland | 318—334 X |

OTHER REFERENCES
General Electric publication, Economy Power Semiconductor Applications, March 1965, see p. 10, top figure.

ORIS L. RADER, Primary Examiner

A. G. COLLINS, Assistant Examiner

U.S. Cl. X.R.

307—310; 318—471; 321—45; 323—22